May 2, 1967 R. T. CORNELIUS 3,317,081
BOTTLE CARRIER
Filed June 14, 1965 4 Sheets-Sheet 1
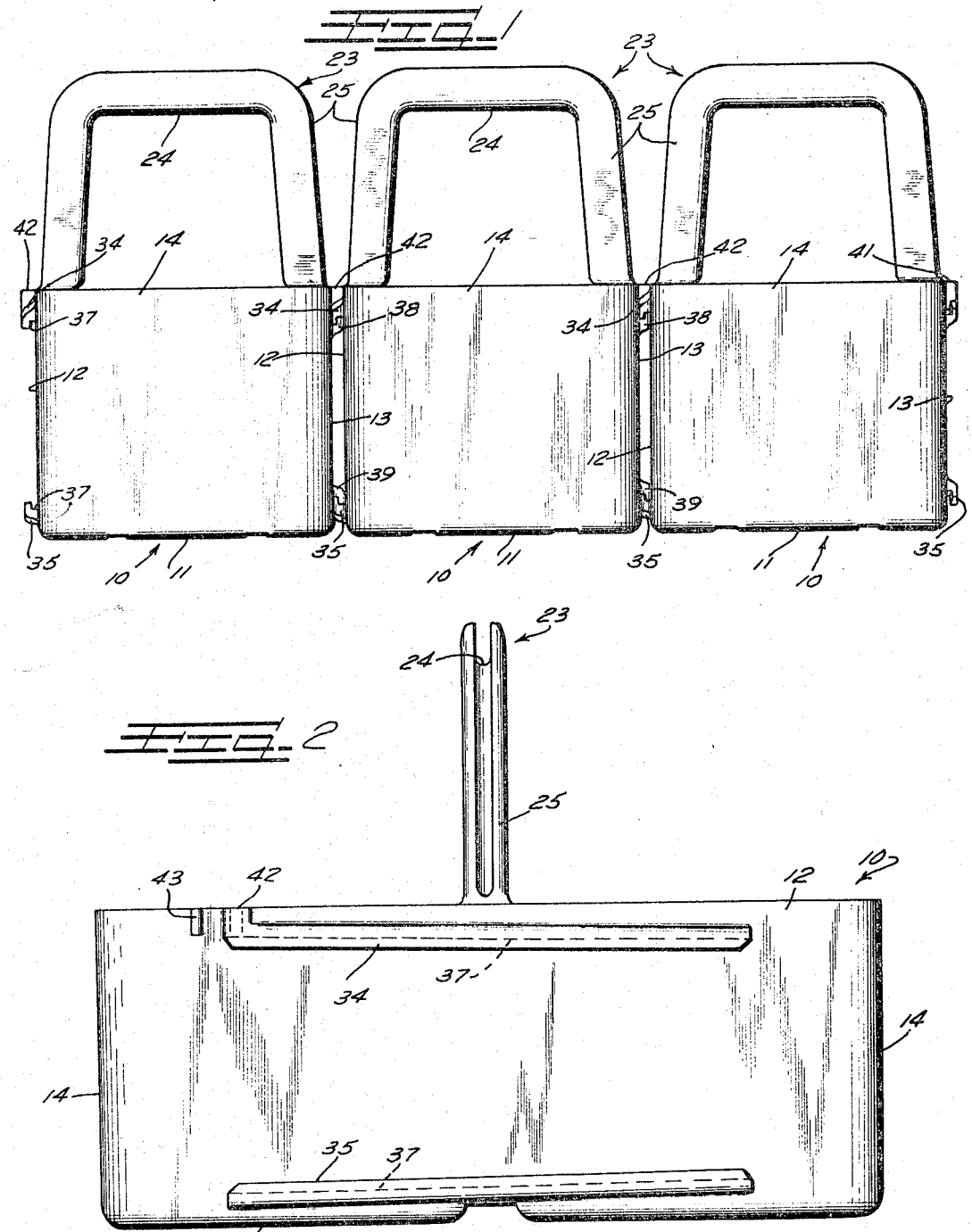
INVENTOR.
RICHARD T. CORNELIUS
BY *Hill, Sherman, Meroni, Gross & Simpson* ATTORNEYS

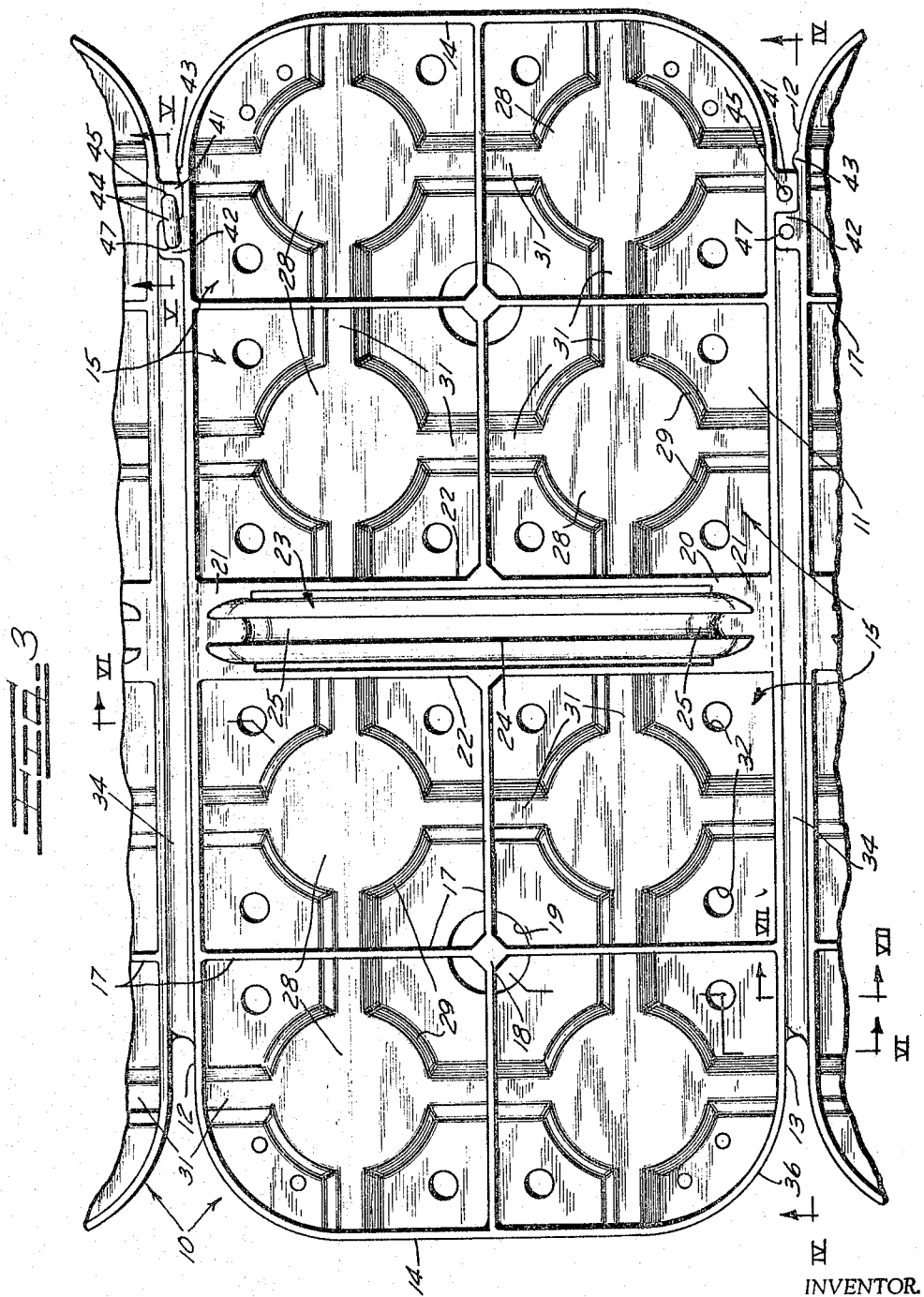

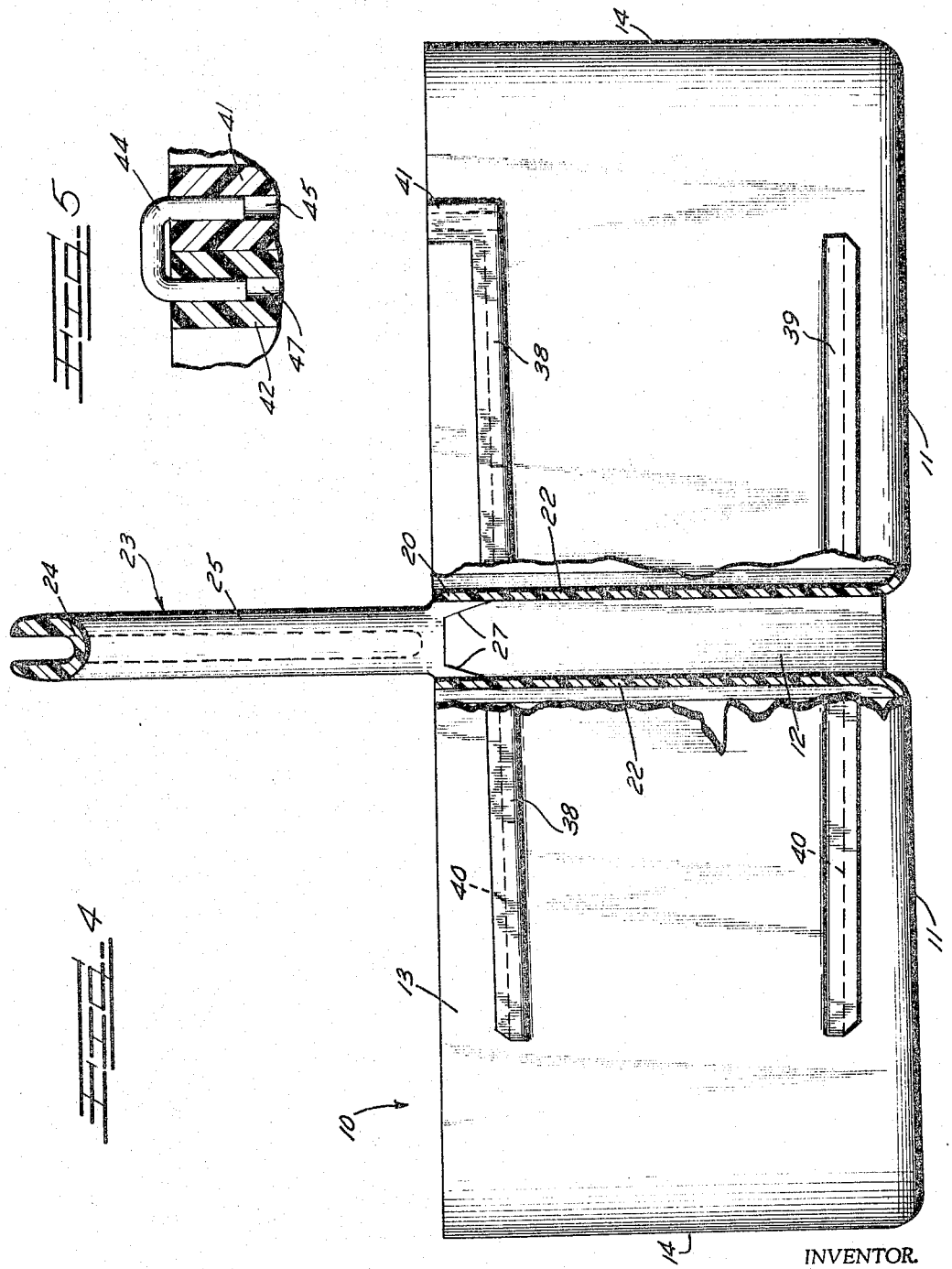

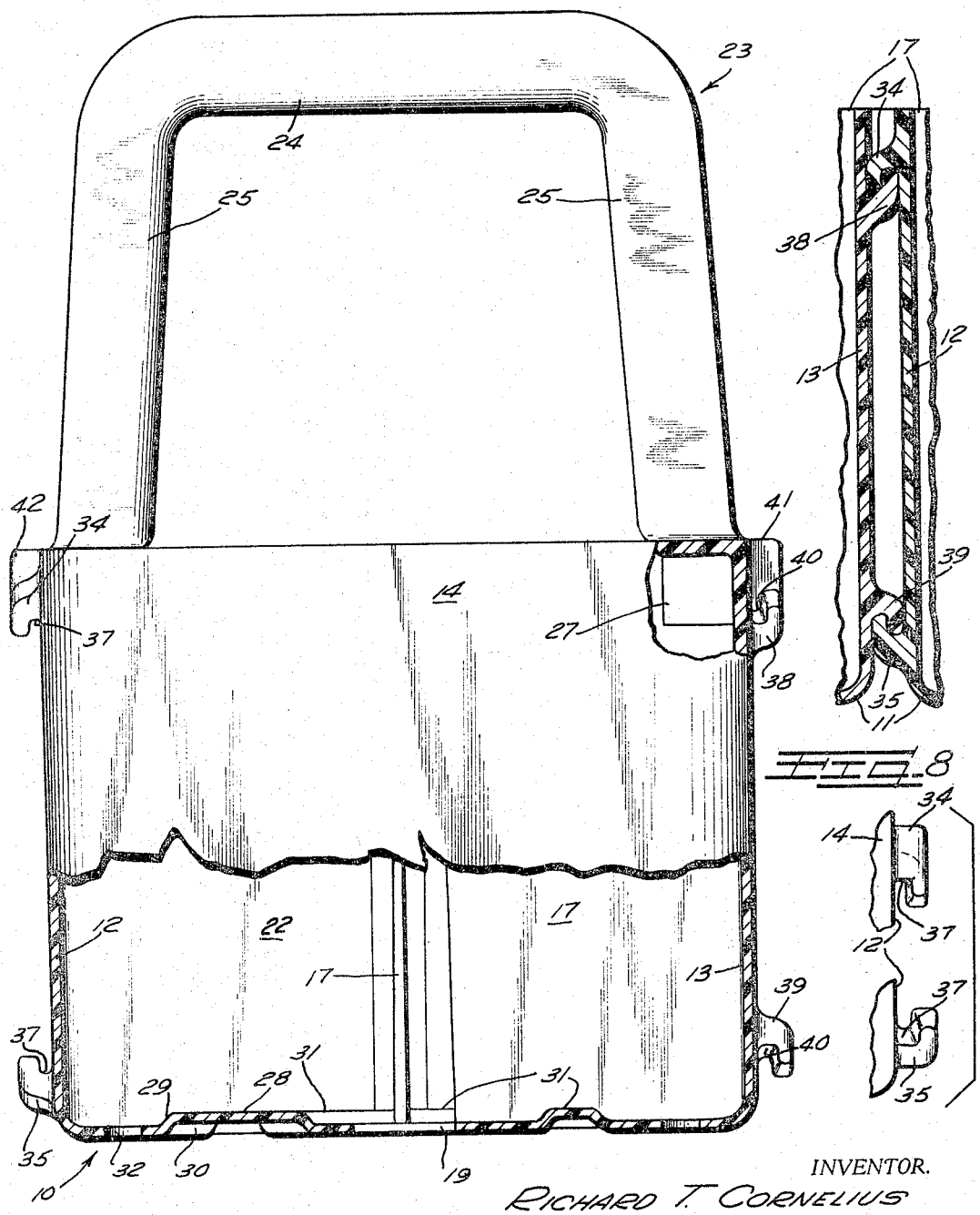

United States Patent Office 3,317,081
Patented May 2, 1967

---

3,317,081
BOTTLE CARRIER
Richard T. Cornelius, Minneapolis, Minn., assignor to
The Cornelius Company, Anoka, Minn., a corporation
of Minnesota
Filed June 14, 1965, Ser. No. 463,814
14 Claims. (Cl. 220—102)

This invention relates to improvements in bottle carriers or cases, and is more particularly concerned with a novel carrier construction especially adapted to be molded from suitable plastic material such as high density polyethylene. This carrier is constructed and arranged for handling, distribution and sale of beverages in crown-capped bottles, and is especially capable of being handled and filled in bottling equipment designed for standard twenty-four bottle wooden cases, but having an important advantage over the wooden cases in that the present carrier is in the form of an individual, separable, fully self-contained unit having a predetermined evenly divisible fraction of twenty-four bottle capacity, such as eight-pack, for supplying the self-service trade.

Purchasers of bulk quantities of bottled beverages in the self-service retail trade are largely women, and often children, who find it impossible or at least inconvenient, due to package bulk and weight, to handle the standard twenty-four bottle cases in which bottlers of beverages can most economically process the six- to sixteen-ounce bottle range. Washing, handling and filling equipment in the beverage bottling works, supporting racks in transportation conveyances such as delivery trucks, and the like, are conventionally designed and proportioned to accommodate the standard twenty-four bottle wooden carrying cases.

For the bulk purchase, self-service market, therefore, paper carriers have been devised with convenient handles and which will support a reasonable load of filled beverage bottles for quantity sales within the physical limits of the paper carriers to withstand the load. For beverage bottles of the twelve to sixteen ounce size, such paper carriers have been made in suitable subdivisions of twenty-four, most generally four-, six- or eight-packs. These are processed by the bottler, transported and delivered to the retailer in wooden trays containing an array of a total of twenty-four filled bottles.

On the outside surfaces of the wooden tray walls are generally applied advertising indicia intended to promote sales of the particular beverage. When the retailer receives the loaded trays, however, they are usually unloaded and the bottle-packs stacked in a sales and display area and the trays removed to a storage room. Hence, the bottler receives little if any value from the tray-carried advertising because the retail purchaser rarely, if ever, sees the trays.

It is also a known fact that the paper carriers are relatively short lived, and thus the bottler receives only a minimum advertising budget value from any indicia that may be applied to the paper carriers. Further, in view of their relatively short service life, and thus limited filled bottle sales and empty bottle return cycles, a substantial replacement cost is involved.

The self-service retail purchasing public becomes conditioned by habit to the pack unit sizes available. Where only four- or six-packs are available, a purchaser will ordinarily buy one or two of these packs. On the other hand, where eight-packs are made available, each sale is proportionately increased. Significant enhancement in total sales volume can thus be generated by making regularly available the largest practicable retail pack size.

It is, therefore, a prime object of the present invention to provide a new bottle carrier or case structure, desirably of a one-piece molded plastic construction, which will serve directly as a bulk retail sales bottle-pack, avoids the need for carrying trays to transport the same to the retail outlet, is adapted for handling and bottle-filling in beverage bottling works equipment designed for twenty-four bottle standard wooden cases, can be transported in the supporting racks designed for standard twenty-four bottle wooden carriers in transportation conveyances such as delivery trucks, and can be handled by the bottling works personnel and truckers much the same as the standard wooden cases, but on reaching the retailer provides bottle-packs of a maximum, such as eight-pack, capacity catering to self-service bulk retail purchasers.

Another object of the invention is to provide a new and improved plastic retail sales pack bottle carrier constructed and arranged to be coupled with like carriers to afford an assembly which can be handled in the conventional bottling equipment for standard twenty-four bottle wooden cases and can be manipulated substantially like a standard twenty-four bottle case but is readily separable from its companions for bulk retail sales purposes, all without the need for any auxiliary or supporting or carrying tray. Thereby, advertising and identifying indicia on the carrier are directly effective throughout every cycle of handling of the carrier between bottler and retail purchasers.

A further object of the invention is to provide a new and improved bottle carrier or case structure of the character described adapted to be made in one-piece molded plastic units, utilizing minimum material and especially devised for high speed, economical production.

Still another object of the invention is to provide a new and improved molded plastic bottle-carrier structure of the eight-pack size adapted to be used as an individual unit or to be coupled with other such units to provide a composite carrier assembly adapted to be randomly interchangeably processed with standard twenty-four bottle wooden carriers, and when filled adapted to be stacked either individually or in the composite carrier assembly with like carriers or even in the composite carrier assembly adapted to be randomly stacked with the standard wooden carriers, if desired.

Yet another object of the invention is to provide a new and improved molded plastic bottle-carrier construction embodying a separable multi-unit assembly.

A yet further object of the invention is to provide new and improved means for interlockingly but separably coupling a plurality of plastic bottle carriers together.

A still further object of the invention is to provide an improved handle structure in a one-piece molded plastic bottle carrier.

An additional object of the invention is to provide a new and improved thin-shell, substantially rigid molded plastic bottle-carrier structure of a convenient bulk retail sales size and having novel features affording in a coupled, unit assembly length and width compensation simulating that of a standard wooden carrier to facilitate handling and filling in a bottling plant equipped to handle standard twenty-four bottle wooden carriers.

Other objects, features and advantages of the present invention will be readily apparent from the following detailed description of a preferred embodiment thereof, taken in conjunction with the accompanying drawings, in which:

FIGURE 1 is a side elevational view of a coupled assembly of bottle carriers or case units embodying features of the invention;

FIGURE 2 is a side elevational view of one of the individual carrier units;

FIGURE 3 is a top plan view of one of the bottle-carrier units, showing it coupled between other similar units;

FIGURE 4 is a side elevational view, partially in section, taken substantially on the line IV—IV of FIGURE 3;

FIGURE 5 is a fragmentary sectional elevational view taken substantially on the line V—V of FIGURE 3 and on an enlarged scale;

FIGURE 6 is an enlarged end elevational view of the carrier unit, partially broken away to reveal details of structure, and partially in transverse section taken substantially on the line VI—VI of FIGURE 3;

FIGURE 7 is an enlarged fragmentary sectional detail view taken substantially on the line VII—VII of FIGURE 3; and FIGURE 8 is a fragmentary elevational detail view looking endwise into the interlock and spacer flange structures along one side of the carrier.

According to the present invention, a plastic bottle-carrier construction is provided comprising individual, self-contained units, each of which is adapted to support a given number of beverage bottles, such as eight, thereby serving as an eight-pack carrier suitable for retail sales to domestic consumers and entirely eliminating any need for paper carriers and handling trays. Each of the carrier units is constructed and arranged to be coupled separably with a plurality of companion identical units to make up a twenty-four bottle case assembly for convenience in processing in standard bottling plants having machinery adapted for standard twenty-four bottle wooden cases in the washing, filling, loading and conveying procedures.

In the coupled relationship, the units are adapted to be handled in the bottling plant, loaded for transportation, transported and delivered to destination and otherwise handled substantially the same as the standard wooden cases. By virtue of provision for outside dimensional relationships simulative of those for the standard wooden carriers, the coupled multiple unit carrier assemblies of the present invention can, when filled, be randomly handled with the standard wooden carriers for crown-capped beverage bottles.

Every feature of the illustrated example of the plastic bottle carrier is adapted for one-shot molding. The upright surfaces are provided with ample though minimum draft for ready separation of the rigidified molded carrier from the dies. All wall areas and dividers of the carrier lend themselves to minimum shell wall or web thicknesses throughout the structure. Plastic material on the order of high density polyethylene is contemplated in the molded, substantially rigid, self-sustaining structure, and that is intended to be the connotation of the term "plastic" as used herein.

As shown in FIGURE 1, a bottle-carrier structure 10 is provided which is constructed and arranged to be coupled with a plurality, in this instance three, identical carriers 10 to form an assembly which in length and width simulates a standard wooden carrier for handling the same size range and volume of crown-capped beverage bottles. To this end, each of the carriers 10 comprises a bottom or base wall structure 11 from which rise integral opposite spaced parallel side walls 12 and 13, and similar opposite end walls 14, all cooperating to provide a generally tray-like bottle-receiving receptacle area. As will be noted, the integral junctures of the several walls with one another are on respective radius juncture ribs affording a smooth, reinforced relationship.

Within the receptacle area of the carrier, means are provided subdividing the same into the desired number of upwardly opening individual bottle-receiving pockets or cells 15 (FIG. 3), in this instance comprising eight in number. Each of the cells 15 is bounded on two sides by upright integral divider web partitions 17 which are arranged in right angular relation in each set of four cells.

All of the partitions 17 are integral with the base wall 11 and are integrally joined on a reinforcing post-like juncture 18 over a drainage hole 19 in the bottom wall provided to facilitate washing of the carrier. Two of the partitions 17 in each set are aligned across the width of the carrier and have their opposite ends respectively integrally joined to the side walls 12 and 13. The remaining two partitions 17 in each set extend longitudinally centrally in the tray area oppositely from the post 18 and the outermost one of such dividers has its end integral with the adjacent end wall 14.

In the preferred construction shown, the end walls 14 are spaced apart a distance which simulates the outside width dimension of a standard wooden carrier. Since the end walls 14 and the transversely related dividers 17 are substantially thinner than comparable parts of a wooden carrier, means are provided to compensate for such differential, herein comprising a transverse divider 20 of ample compensating width and at its opposite ends joining respectively the side walls 12 and 13. Throughout its length, the compensating divided 20 is, for conservation of material and to facilitate molding, of a hollow construction, having a flat top 21 and similar opposite side walls 22 to which the adjacent ends of the inwardly extending longitudinal dividers 17 are integrally joined. Thereby, the compensating dividers 20 defines a generally rib-like structure which opens downwardly through the bottom wall 11 throughout the length of the rib, with the ends of the rib closed by the respective side walls 12 and 13 except for a limited distance adjacent the bottom wall 11 where the side walls 22 join the bottom wall on reinforcing radius junctures (FIGS. 2 and 4). Preferably, the top edges of the walls 12, 13 and 14 and of the dividers 17 and the divider top wall 21 are in a common horizontal plane.

To facilitate use of the bottle-carrier unit 10, an upstanding handle 23 is provided centrally of the carrier, and conveniently attached to the compensating divider 20 which affords ample area for the width of the handle between the two equal sets of bottle cells 15. As shown, the handle 23 is molded integrally with the compensating divider rib 20 and is of generally inverted U-shape in side elevation, extending transversely across the center of the carrier parallel with the divider 20. The handle comprises a horizontal hand-grip or handle bar 24, supported at suitable elevation above the divider top wall 21 by integral riser strut leg bars 25. In a desirable construction, the handle bar 24 and the leg bars 25 are of substantially similar, continuous respectively upwardly and outwardly opening generally U-shape cross-section, with a rounded inner contour. At their lower ends, the leg bars 25 integrally join the divider top 21, and with respective reinforcing terminal extensions 27 joining the lower end portions of the leg bars to the adjacent upper margins of the divider rib side walls 22 (FIGS. 4 and 6) and to the respective side walls 12 and 13. Thereby an extremely well-balanced load-distributive and stress-resistant structure is attained and the handle enables manipulation of the carrier either through grasping the handle bar 24 or either of the leg bars 25.

By having the handle 23 narrower from the base of the legs 25 upwardly than the spacing afforded between the divider side walls 22, and shorter than the space between the side walls 12 and 13, as well as having the height of the handle shorter than the height of the divider 20, reception of the handle within the hollow divider 20 of a like superposed carrier during empty stacking is faciliated. Thereby, the top of the internested handle remains clear of the handhole of the handle. In this stacked relationship, the base wall 11 will rest in well-supported relation on the coplanar tops of the dividers 17 and 20. Also, by having the handle legs 25 tapering downwardly and outwardly, at least on their outer edges, easy stacking assembly and registration of the carriers is promoted. In the stacked relationship, the outside surfaces of the base end portions of the handle legs 25 fit generally nestingly within the lower end of the downwardly opening well receptive of the handle in the divider 20. At its top, the handle 23 preferably extends above the base wall 11 to a height less than the tops of bottles to be supported in the carrier, whereby a flat bottomed wooden carrier of standardized dimensions, or any other flat surface may be freely stacked thereon.

A substantial aggregate area of the base wall 11 lies in a common bottom supporting plane to afford frictional surface to minimize undesirable slippage on a supporting surface. However, to maintain the base wall 11 of minimum practical molded section but with such reinforcement as to afford adequate bottle-supporting strength without sagging, an advantageous pattern of reinforcing ribs and flanges is provided on the base wall. To this end, the base wall area in each of the cells 15 has a central upwardly offset and preferably generally circular flat area 28 connected with the normal plane of the base wall by means of a reinforcing, offsetting tapered generally annular flange 29. This affords in the bottom of each of the cells a downwardly opening shallow pocket or socket recess 30 (FIG. 6) of a size to freely nestably receive the crown of a bottle cap when stacking the carriers 10 with filled beverage bottles, or to receive the top ends of respective empty bottles when stacking carriers of empty bottles. Thereby, freedom from accidental slipping displacement of the stacked carriers either longitudinally or laterally from the stack is attained.

Further reinforcement of the base wall areas within the bottle-receiving pockets or cells 15 is attained by having a pattern of raised, downwardly hollow, shallow reinforcing ribs 31 which radiate symmetrically from the reinforcing flanges 29 of the offset areas 28. In a desirable arrangement, a pattern of four reinforcing ribs 31 radiates in equidistantly spaced, 90° interval relation from and coplanar with the respective offset areas 28 in each of the cells 15. These ribs 31 extend integrally through and are reinforcingly connected to the divider webs 17, integrally join the center divider walls 22, join the side walls 12 and 13, and the end walls 14, as the case may be. Through this arrangement, not only is the bottom wall area within each of the cells 15 thoroughly stiffened and reinforced, but stable bottom or base support for bottles is afforded in the cells. Drainage from the depressed area within the cell bottoms bordered by the ribs 31, and not drained by the holes 19, is afforded by drainage holes 32 where such depressed areas are also bounded by a generally right angular web and wall juncture. Smaller drainage holes 33 are desirably provided in the depressed areas which are bounded by respective large radius corner junctures 36 between the side and end walls of the carrier.

Means are provided for separably coupling the carriers 10 primarily to afford twenty-four bottle-carrier assemblies suitable for processing through the conventional bottling plant equipment for standard wooden carriers, but also to enable coupled assemblies of the carriers to be handled in that fashion for transportation in equipment designed for standard twenty-four bottle wooden carriers, and to facilitate multiple-carrier deliveries and handling by delivery and service personnel. To this end, interlocking coupling structures are provided on the outer sides of outer walls of the respective carrier units. More particularly, such coupling means are provided on the longitudinal or side walls 12 and 13 of the carrier units, the means on one such side wall being directly complementary to that on the opposite side wall, and standardized with respect to all of the other carriers 10 so that they can be interchangeably and randomly coupled with one another, by pairs, if desired, by threes to afford a standard wooden carrier simulating assembly, or in any other desired coupled assembly.

Having special reference to FIGURES 2, 4 and 6–8, the carrier coupling means are provided in a structure such that the carriers are adapted to be coupled and uncoupled by relative longitudinal movement. Accordingly, the coupling means on the longitudinal side wall 12 desirably comprises a pair of longitudinally extending, vertically spaced coupling and interlock flanges 34 and 35 of generally L-shape cross-section projecting integrally outwardly from the outer face of the side wall 12, and each providing an interlock groove 37 alongside and on one side defined by the face of the side wall. Both of the flanges 34 and 35 extend throughout the major longitudinal extent of the side wall 12, with the flange 34 on the upper margin of the wall the flange 35 on the lower margin of the wall.

On the side wall 13 vertically spaced, longitudinally extending interlock coupling flanges 38 and 39 are provided, respectively complementary to the coupling flanges 34 and 35. Each of the coupling flanges 38 and 39 extends integrally along the outer face of and throughout the major longitudinal extent of the side wall 13, and defines with the side wall a respective interlock groove 40. The coupling flange 38 is located along the upper margin of the side wall 13 while the coupling flange 39 is located along the lower margin of this side wall.

In order to enable lifting of an assembly of coupled carriers by the handle 23 of either of the carriers, the construction and relationship of the two sets of coupling flanges 34, 35 and 38, 39 is such that when coupled with the complementary flanges of a companion carrier, either the lower coupled flanges or the upper coupled flanges serve to support the carrier which is coupled to the carrier being lifted by its handle, while the remaining coupled flanges serve as stabilizers. For this purpose, in each set of flanges the groove in one of the pair opens upwardly and the groove in the other of the pair opens downwardly, while the grooves in the opposite complementary set open reversely. More particularly, the groove 37 of the upper coupling flange 34 opens downwardly while the groove 37 in the lower flange 35 of that set opens upwardly. In the complementary coupling flanges 38 and 39, the grooves 40 open respectively upwardly and downwardly. Thereby, when the coupling flanges are interengaged as shown in FIGURES 1, 3 and 7, lifting of the assembly through the handle of the carrier having the side wall 12 results in load transmission of the companion carrier through the lower coupling flanges 35 and 39, while the upper coupling flanges 34 and 38 serve as stabilizers. If the carrier having the side wall 13 is the load carrying unit of the assembly, the upper coupled flanges 34 and 38 bear the load of the coupled carriers while the lower coupling flanges 35 and 39 serve as stabilizers.

Manipulation of the carriers into coupled relation is effected by aligning the respective complementary sets of coupling flanges endwise with the generally vertically extending tongue-like portions of the flanges in line with the grooves of the complementary set of coupling flanges and the outer surfaces of the respective flanges lying against the opposed side wall surfaces affording lead-in guides therefor. Relative longitudinal movement of the carriers causes the complementary coupling flanges to interengage slidably in generally inter-hooked relationship. Such sliding coupling interengagement of the flanges is facilitated by having the respective complementary sets of flanges located in low pitch convergence, rather than parallel, so that in the initial alignment of the complementary coupling flanges of a pair of the containers and until the fully coupled relationship is attained only a loose inter-hooking results which becomes progressively closer as the fully interlocked coupled relationship is approached. This easy coupling manipulation is further enhanced by a low pitch narrowing of the respective grooves 37 and 40 from the lead-in ends of the grooves toward the opposite ends. These complementary converging relationships of the coupling flanges and tapering narrowing of the grooves are so predetermined and arranged that in the fully coupled relationship wherein the end walls 14 of the coupled carriers are aligned, a reasonably snug interengagement of the coupling flanges is effected.

Suitable stop means are provided on the carriers, preferably in association with the uppermost of the coupling flanges to limit longitudinal relative coupled interengagement of the flanges to merely the closely interengaging relation but without binding, so that separation of the containers can be readily effected when desired by relative longitudinal releasing manipulation thereof. For this purpose, the end of the flange 38 opposite its lead-in end, that is, its higher end, has integral therewith a stop shoulder lug or boss 41 integral with the side wall 13 and extending upwardly, in this instance, to the top edge of the side wall. Coactive with the stop shoulder boss 41 is a complementary stop shoulder boss 42 on the corresponding, that is, high end of the coupling flange 34. Abutment of these stop shoulder bosses 41 and 42, as best seen in FIG. 3, limits longitudinal assembly of the coupling flanges to the proper interengaging relationship and assures alignment of the end walls of the coupled containers.

Unintentional longitudinal separation of the coupling flanges by forces acting in reverse to the manipulation which effected the coupled relationship is prevented by auxiliary interlock means. In one desirable form, such interlock means comprise an interlock lug 43 (FIGS. 2 and 3) integral with the upper margin of the outer side of the side wall 12 and spaced from the shoulder boss 42 a distance substantially equal to the width of the shoulder boss 41. As will be observed, the location of the interlock lug 43 is on a portion of the side wall 12 which is sufficiently spaced beyond the nearest divider web 17 so that a slight inward resilient yielding of such side wall will permit camming of the shoulder boss 41 past the rounded, limited projection contour of the interlock lug. In effect, therefore, during longitudinal relative assembly movement of the coupling flanges moderate relative assembly force or manipulative pressure will cause the shoulder boss 41 to snap past the interlock lug 43 into the interlocked relationship. Conversely, intentional separation of the carriers is effected by exerting a moderate relative longitudinal separating force which will cam and snap the shoulder boss 41 into released relation past the interlock lug 43. This interlock may thus be considered a strain separable interlock or coupling.

In addition to the interlock lug 43, or alternative to the interlock lug 43, releasable key means may be provided for interlocking the carriers against longitudinal separation in the one relative direction permitted by the shoulder bosses 41 and 42. While such key means may take on numerous and varied forms, the principal function thereof is to effect an interengagement with relatively separable portions of the carriers. A representative form of such key means comprises a generally U-shaped or hairpin clip or key member 44 (FIGS. 3 and 5) having legs which are releasably engageable in respective upwardly opening socket bores 45 and 47 in the shoulder bosses 41 and 42, respectively. The key member 44 is readily insertable into interlocking relation to the carriers upon stopping abutment of the shoulder bosses, whether or not the interlock lug 43 is present. In the interlocking assembly, the key 44 prevents separating movement of the coupling flanges in the direction opposite to the relative assembly direction of movement of the carriers. By withdrawing the key 44, separation of the carriers can be readily effected in the direction of separating movement of the shoulder bosses 41 and 42.

As a result of the separably interlocked coupling of the carriers 10, they are jointly movable in any possible direction as may be effected by manipulation of any one of the coupled carriers. Means integral with the carrier units separably couple them and enable relative movement therebetween in one horizontal axis and preclude relative movement therebetween in the other horizontal and in the vertical axes, and means are provided operative in said one horizontal axis to releasably or overpowerably normally restrain said relative movement. As applied to the illustrative disclosures the one axis extends longitudinally of the coupled carriers, and any unintentional force tending to separate the coupled carriers is effectively resisted by the interengagement of the stop shoulders associated with the integral coupling flanges and the interlock lugs or the interlock key structure. In the other two axes, namely vertical and horizontally transverse, the coupling flanges afford positive interlock as well as a high degree of stability, such that any two or three of the carriers in coupled assembly can be handled empty or full as a substantially solid unit. Such handling is greatly facilitated by the sturdy handle structure which enables manipulation either through the top handle bar or one of the handle legs on any one of the coupled carriers as may be most convenient.

In the unitary handling of coupled carriers, the coupling flanges 34, 35 and 38, 39 function in addition as sturdy reinforcing ribs along the sides of the respective containers. Due to their length along the major longitudinal extent of the respective side walls, and their substantial cross-sectional rib mass throughout their lengths, the coupling flanges afford substantial resistance to bending stresses on the walls. Additionally, since the coupling flange ribs integrally join the contiguous ends of the divider webs 17 and the central web side walls 22, the flange ribs are integrally connected to one another through such webs and divider walls and thus afford a sturdy integral frame in each of the carriers. These frames are then rigidly united in the coupled relationship of the carriers.

Still another function of the coupling flange-ribs 34, 35 and 38, 39 is to provide compensation in the longitudinal direction across three of the coupled carriers 10 to simulate that dimension of a standard wooden carrier in order to facilitate processing in a conventional bottling plant equipped to handle the standard wooden carriers.

It will be observed that ample area is provided on the outer faces of the end walls 14, and on the side walls between the respective integral pairs of coupling flanges thereon, to receive suitable advertising indicia. Particularly on the side walls such indicia are thoroughly protected against scuffing, or the like, by the outwardly projecting coupling flange structures serving as protective buffers to maintain a spaced relation between such side wall areas and extraneous objects.

It will be understood that modifications and variations may be effected without departing from the scope of the novel concepts of the present invention.

I claim as my invention:

1. A bottle carrier assembly including:
   (a) a plurality of plastic carrier units each of which comprises a one-piece plastic tray having base and upstanding side and end walls, with divider means dividing the tray into an array of upwardly opening bottle-receiving cells;
   (b) complementary longitudinally extending tongue and groove coupling flange structures on opposed side walls of the carrier units interengaged by longitudinal relative assembly movement of the carrier units with said base in horizontal orientation and separable by reverse relative longitudinal movement of the carrier units;
   (c) and stop means respectively associated with said tongue and groove flange structures and comprising a shoulder at one extremity of one of said structures facing in one longitudinal direction and a complementary shoulder on the corresponding extremity of the other of said structures and facing in the opposite longitudinal direction, said shoulders opposing one another and abutting in face-to-face relation at the end of said longitudinal relative assembly movement of said carrier units positively to limit relative assembly movement of the carrier units to a predetermined aligned relationship of the units.

2. An assembly of plastic bottle carriers including:
(a) a pair of plastic carrier units each of which has a bottle-supporting tray construction providing a side wall, and the side walls being in opposed adjacent relation;
(b) longitudinally extending complementary tongue and groove coupling flanges on the respective upper adjacent opposed portions of said side walls and interengaged by relative longitudinal movement of the carrier units;
(c) longitudinally extending respective complementary tongue and groove coupling flanges on respective lower adjacent opposed portions of said side walls and also interengaged by said relative longitudinal movement of the carrier units;
(d) and interengaging respectively oppositely longitudinally facing stop shoulder bosses on said side walls aligned with respective extremities of said flanges which come together at the end of said relatively longitudinal movement and facing toward one another and abuttingly interengageable in the fully longitudinally assembled relationship of said coupling flanges.

3. An assembly of plastic bottle carrier including:
(a) a pair of plastic carrier units each of which has a bottle-supporting tray construction providing a side wall, and the side walls being in opposed adjacent relation;
(b) longitudinally extending complementary tongue and groove coupling flanges on the respective upper adjacent opposed portions of said side walls and interengaged by relative longitudinal movement of the carrier units;
(c) longitudinally extending respective complementary tongue and groove coupling flanges on respective lower adjacent opposed portions of said side walls and also interengaged by said relative longitudinal movement of the carrier units;
(d) interengaging stop shoulder bosses on said side walls interengageable in the fully longitudinally assembled relationship of said coupling flanges;
(e) and a resiliently strain separable interlock lug on one of said side walls interengageable with the stop shoulder boss on the other of said side walls in the stopping engagement of said stop bosses and functioning to resist separating longitudinal movement of said bosses and thereby of said coupling flanges.

4. A molded plastic bottle-carrier assembly comprising:
(a) three self-contained molded plastic bottle carrier units each having a capacity to support eight beverage bottles as a pack and each being of elongated tray form having opposite longitudinal side walls and connecting opposite end walls, said end walls being spaced apart to substantially simulate the width of a standard twenty-four bottle wooden carrier;
(b) separable coupling means longitudinally slidably interengageable in one direction and located on the side walls of the carrier units maintaining them separately interlocked for manipulation of the interlocked assembly as a unit and with the end walls of the carrier units aligned, said coupling means serving with the combined width of the carrier units to simulate the length of said standard wooden carrier, so that the interlocked assembly can be processed in bottling plant equipment designed for standard wooden carriers;
(c) stop means on said side walls determining the aligned relation of said side walls;
(d) and separable auxiliary interlock means retaining said coupling means against unintentional separation in the opposite longitudinal direction.

5. An assembly of individual molded plastic eight-pack bottle-carrier units constructed and arranged for handling and processing in bottling plant equipment designed for standard twenty-four bottle wooden carriers comprising:
(a) three molded shell plastic carriers each of which comprises a bottle-carrying tray structure including base, side, and end wall structure of thin shell construction with the end walls spaced apart to simulate the width of the standard wooden carriers;
(b) dividers subdividing the tray area of each of the plastic carrier units into an array of eight bottle-receiving cells, said dividers being of a thin section substantially similar to that of the plastic carrier walls except for a transverse divider across the longitudinal center of each of the plastic carriers and comprising a hollow spaced wall construction affording spacer compensation to provide said standard wooden carrier width simulation of said end walls;
(c) and longitudinally extending and slidably interengageable rib-like separably interlocking coupling structure on the outer sides of the side walls of the plastic carriers by which they are held in longitudinally parallel relation with the end walls in alignment, said coupling structure affording dimensional compensation lengthwise of the assembly to effect simulation of the length of the standard wooden carriers and having means preventing any upward separation of any of the plastic carriers so that the interlocked carriers can be lifted as a unit by manipulation of any one of the plastic carriers.

6. A molded plastic bottle carrier comprising:
(a) a trap structure comprising thin shell bottom side and end walls;
(b) a plurality of dividers subdividing the tray into a plurality of upwardly opening bottle-receiving pocket cells and including transverse dividers integrally joining the side walls;
(c) one of said transversely extending dividers being located on the longitudinal center of the carrier and comprising a hollow rib having spaced apart side walls integrally joining the side walls of the carrier;
(d) and a combined reinforcing rib and coupling flange extending longitudinally along at least one side wall of said carrier for interlocking coupling engagement with a complementary such rib and coupling flange on an opposing side wall of a carrier to be coupled in assembly, and said rib-flange integrally reinforcingly joining and transverse dividers including the side walls of said hollow divider.

7. A molded plastic bottle carrier comprising:
(a) an elongated tray structure comprising thin shell bottom, side and end walls;
(b) a plurality of dividers subdividing the tray into a plurality of upwardly opening bottle-receiving pocket cells and including transverse dividers integrally joining the side walls;
(c) one of said transversely extending dividers being located centrally of the length of the carrier and comprising a hollow rib having spaced apart side walls integrally joining the side walls of the carrier;
(d) and a handle having a handle bar spaced above said hollow divider and end legs integrally joined to the hollow divider side walls and said carrier side walls at their juncture and including reinforcing terminal extensions joining said divider side walls and said carrier side walls.

8. A one-piece molded plastic bottle carrier comprising:
(a) a thin shell elongated tray having a bottom wall, end walls and side walls;

(b) a central transverse hollow rib divider having a top wall and spaced apart side walls joining said carrier side walls and opening downwardly through the bottom wall;

(c) a handle having a handle bar above said top wall and having end legs integrally joining said top wall and said divider side walls and including reinforcing extensions integrally joining said carrier side walls;

(d) transverse dividers parallel to said hollow divider side walls and said end walls and located intermediately therebetween and joining the side walls of the carrier and integrally joined by longitudinally extending dividers integral at respective ends thereof with said end walls and with said side walls of the hollow divider, and thereby subdividing the area within the side and end walls into upwardly opening bottle-receiving pocket cells;

(e) reinforcing flange and rib formations in the areas of the cell areas of the bottom wall and including in each cell area an upwardly offset bottom wall portion defining a downwardly opening bottle top-receiving recess cavity socket to facilitate non-slipping stacking on a filled carrier;

(f) longitudinally extending reinforcing rib and combined interlock coupling flanges on the carrier side walls and integrally joining said hollow rib side walls and said intervening transverse dividers, whereby to afford a substantially rigid frame structure tied into said handle, and said rib-flanges affording means for coupling the carrier with like carriers having complementary interlock flange structure;

(g) stop means associated with said rib-flanges for defining an aligned relationship of coupled carriers;

(h) and interlock means on said carrier side walls cooperable with said stop means for resisting separation of coupled carriers.

9. A one-piece molded plastic bottle carrier comprising:

(a) a thin shell elongated tray having a bottom wall, end walls and side walls;

(b) a central transverse hollow divider having spaced apart side walls joining said carrier side walls and opening downwardly through the bottom wall; and (c) a handle having a handle bar above said divider and having end legs integrally joining said divider side walls and including reinforcing extensions extending downwardly within said hollow divider and integrally joining said carrier side walls.

10. A one-piece molded plastic bottle carrier comprising:

(a) a thin shell elongated tray having a bottom wall, end walls and side walls;

(b) a central transverse hollow divider having spaced apart side walls joining said carrier side walls and opening downwardly through the bottom wall;

(c) a handle having a handle bar above said divider and having end legs integrally joining said divider side walls and including reinforcing extensions integrally joining said carrier side walls;

(d) transverse dividers parallel to said hollow divider side walls and said end walls and located intermediately therebetween and joining the side walls of the carrier and integrally joined by longitudinally extending dividers integral at respective ends thereof with said end walls and with said side walls of the hollow divider, and thereby subdividing the area within the side and end walls into upwardly opening bottle-receiving pocket cells; and (e) longitudinally extending reinforcing rib and combined interlock coupling flanges on the carrier side walls and integrally joining said hollow rib side walls and said intervening transverse dividers, whereby to afford a substantially rigid frame structure tied into said handle, and said rib-flanges affording means for coupling the carrier with like carriers having complementary interlock flange structure.

11. A one-piece molded plastic bottle carrier comprising:

(a) a thin shell elongated tray having a bottom wall, end walls and side walls;

(b) a central transverse hollow divider having spaced apart side walls joining said carrier side walls and opening downwardly through the bottom wall;

(c) a handle having a handle bar above said divider and having end legs integrally joining said divider side walls and including reinforcing extensions integrally joining said carrier side walls;

(d) transverse dividers parallel to said hollow divider side walls and said end walls and located intermediately therebetween and joining the side walls of the carrier and integrally joined by longitudinally extending dividers integral at respective ends thereof with said end walls and with said side walls of the hollow divider, and thereby subdividing the area within the side and end walls into upwardly opening bottle-receiving pocket cells;

(e) longitudinally extending reinforcing rib and combined interlock coupling flanges on the carrier side walls and integrally joining said hollow rib side walls and said intervening transverse dividers, whereby to afford a substantially rigid frame structure tied into said handle, and said rib-flanges affording means for coupling the carrier with like carriers having complementary interlock flange structure;

(f) stop means associated with said rib-flanges for defining an aligned relationship of coupled carriers;

(g) and interlock means on said carrier side walls cooperable with said stop means for resisting separation of coupled carriers.

12. A bottle carrier assembly including:

(a) a plurality of molded plastic carrier units each of which comprises a one-piece plastic tray having base and upstanding side and end walls defining a perimeter, with divider means dividing the tray into an array of upwardly opening bottle-receiving cells, each of said units having an axis vertical to said base wall and two principal horizontal axes parallel to said base wall;

(b) means integrally molded with the perimeter of said units and comprising respective complementary flanges facing respectively upwardly and downardly and separably coupling the carrier units, said means enabling relative movement of said units slidably in and out of coupled relation in one horizontal axis and precluding relative movement therebetween in the other two axes;

(c) and stop shoulders facing respectively oppositely in the opposite directions of said one horizontal axis and abuttingly operative in said one axis to stop said relative movement at the end of said relative movement in one of said directions and freely separable in the opposite of said direction.

13. An assembly of plastic bottle carriers including:

(a) a pair of plastic carrier units each of which has a bottle-suporting tray construction providing a side wall, and the side walls being in opposed adjacent relation;

(b) longitudinally extending complementary tongue and proove coupling flanges on the respective upper adjacent opposed portions of said side walls and interengaged by relative longitudinal movement of the carrier units;

(c) longitudinally extending respective complementary tongue and groove coupling flanges on respective lower adjacent opposed portions of said side walls and also interengaged by said relative longitudinal movement of the carrier units, (d) and upwardly extending respective oppositely longitudinally facing stop shoulder bosses on said side walls at adjacent ends of said upper of said coupling flanges and interengageable abuttingly in face-to-face relation to stop said longitudinal movement in the fully longitudinally assembled relationship of said coupling flanges and freely separable when relatively longitudinally moving said carriers for separation thereof.

14. An assembly as defined in claim 13, including key means separably interengageable with said shoulder bosses to interlock the same against separation and thereby retaining the carrier units coupled together.

References Cited by the Examiner

UNITED STATES PATENTS

| | | | |
|---|---|---|---|
| D. 171,132 | 12/1953 | Hudson. | |
| 2,535,493 | 12/1950 | Gerber. | |
| 2,723,484 | 11/1955 | Nelson | 43—54.5 |
| 2,732,969 | 1/1956 | Browne | 220—23.4 |
| 2,821,327 | 1/1958 | Glazer | 220—102 |
| 2,826,332 | 3/1958 | Hudson | 220—104 X |
| 3,055,542 | 9/1962 | Russo | 220—104 |
| 3,114,472 | 12/1963 | Russo | 220—104 |
| 3,131,829 | 5/1964 | Masser | 220—102 |

FOREIGN PATENTS

| | | |
|---|---|---|
| 828,405 | 7/1949 | Germany. |
| 166,449 | 1/1934 | Switzerland. |

GEORGE O. RALSTON, *Primary Examiner*.